US011255042B2

(12) United States Patent
Choung et al.

(10) Patent No.: US 11,255,042 B2
(45) Date of Patent: Feb. 22, 2022

(54) METHOD AND APPARATUS FOR DRYING LAUNDRY USING INTELLIGENT WASHER

(71) Applicant: LG Electronics Inc., Seoul (KR)

(72) Inventors: Dongsoo Choung, Seoul (KR); Yongju Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 16/690,921

(22) Filed: Nov. 21, 2019

(65) Prior Publication Data
US 2020/0087847 A1 Mar. 19, 2020

(30) Foreign Application Priority Data

Aug. 21, 2019 (KR) .......................... 10-2019-0102631

(51) Int. Cl.
| | |
|---|---|
| *D06F 58/30* | (2020.01) |
| *G06N 3/08* | (2006.01) |
| *H04B 7/0413* | (2017.01) |
| *H04W 72/04* | (2009.01) |
| *G06N 3/04* | (2006.01) |
| *D06F 58/38* | (2020.01) |
| *D06F 103/08* | (2020.01) |
| *D06F 103/38* | (2020.01) |

(52) U.S. Cl.
CPC .............. *D06F 58/30* (2020.02); *G06N 3/08* (2013.01); *H04B 7/0413* (2013.01); *H04W 72/0413* (2013.01); *D06F 58/38* (2020.02); *D06F 2103/08* (2020.02); *D06F 2103/38* (2020.02); *G06N 3/049* (2013.01)

(58) Field of Classification Search
CPC ...... D06F 58/30; D06F 58/38; D06F 2103/38; D06F 2103/08; G06N 3/08; G06N 3/049; H04B 7/0413; H04W 72/041
USPC .......................................................... 34/527
See application file for complete search history.

(56) References Cited

U.S. PATENT DOCUMENTS

| | | | | | |
|---|---|---|---|---|---|
| 1,800,228 | A | * | 4/1931 | Pierce ..................... | D06F 58/02 34/564 |
| 2,749,734 | A | * | 6/1956 | Dye ........................ | D06F 17/12 68/20 |

(Continued)

FOREIGN PATENT DOCUMENTS

| | | | | | |
|---|---|---|---|---|---|
| EP | | 2489776 A1 | * | 8/2012 | ............. D06F 58/02 |
| EP | | 3051015 B1 | * | 9/2018 | ............. D06F 33/00 |
| WO | WO-2016122275 A1 | | * | 8/2016 | ........... D06F 29/005 |

*Primary Examiner* — Stephen M Gravini
(74) *Attorney, Agent, or Firm* — Fish & Richardson P.C.

(57) ABSTRACT

Disclosed is a method for drying laundry using an intelligent washer. According to an embodiment of the present disclosure, a method for drying laundry trains a time prediction model for obtaining first remaining time information related to complete dryness of the laundry, obtains first washer state information related to a state of a washer for drying the laundry, obtains the first remaining time information by inputting the first washer state information to the trained time prediction model, and dries the washer based on the obtained first remaining time information, thus precisely predicting the time necessary for complete dryness of wet laundry. According to an embodiment, the washer may be related to artificial intelligence (AI) modules, unmanned aerial vehicles (UAVs), robots, augmented reality (AR) devices, virtual reality (VR) devices, and 5G service-related devices.

18 Claims, 13 Drawing Sheets

(56) References Cited

U.S. PATENT DOCUMENTS

| | | | | |
|---|---|---|---|---|
| 5,644,936 | A * | 7/1997 | Yasutake | D06F 34/28 68/12.02 |
| 5,682,684 | A * | 11/1997 | Wentzlaff | D06F 58/30 34/495 |
| 5,806,204 | A * | 9/1998 | Hoffman | D06F 58/24 34/92 |
| 6,898,951 | B2 * | 5/2005 | Severns | B01J 20/28033 68/5 C |
| 7,062,863 | B2 * | 6/2006 | Chung | D06F 25/00 34/596 |
| 7,380,423 | B1 * | 6/2008 | Musone | D06F 33/00 68/20 |
| 9,133,575 | B2 * | 9/2015 | Hong | D06F 58/24 |
| 9,194,073 | B2 * | 11/2015 | Kwon | D06F 39/083 |
| 10,072,371 | B2 * | 9/2018 | Bae | D06F 39/087 |
| 10,577,741 | B2 * | 3/2020 | Bae | D06F 58/30 |
| 10,995,989 | B2 * | 5/2021 | Ashrafzadeh | D06F 58/02 |
| 11,008,697 | B2 * | 5/2021 | Masters | D06F 58/30 |
| 11,028,527 | B2 * | 6/2021 | Vaive | D06F 49/08 |
| 2009/0255299 | A1 * | 10/2009 | Hiro | D06F 25/00 68/19 |
| 2012/0159808 | A1 * | 6/2012 | Nakamoto | D06F 58/02 34/565 |
| 2020/0010999 | A1 * | 1/2020 | Lee | G06N 20/00 |
| 2020/0087847 | A1 * | 3/2020 | Choung | D06F 58/30 |
| 2021/0108350 | A1 * | 4/2021 | Kwon | D06F 33/40 |

* cited by examiner

METHOD AND APPARATUS FOR DRYING LAUNDRY USING INTELLIGENT WASHER

CROSS-REFERENCE TO RELATED APPLICATION(S)

This application claims priority under 35 U.S.C. 119 to Korean Patent Application No. 10-2019-0102631, filed on Aug. 21, 2019, the disclosure of which is herein incorporated by reference in its entirety.

TECHNICAL FIELD

Embodiments of the disclosure relate to a method and apparatus for drying laundry, and more specifically, to a method and apparatus for drying laundry using an intelligent washer.

DESCRIPTION OF RELATED ART

Generally, washer or washing machine refers to an apparatus for processing laundry, e.g., clothing or bedding, by applying physical and/or chemical actions to the laundry. A washer includes an outer tub which contains wash water and an inner tub which receives laundry and is spinnable inside the outer tub. For a laundry wash, a washer typically undergoes a washing cycle, a spin cycle, and a dry cycle. The washing cycle rotates the inner tub of the washer to remove dirt and stains. The spin cycle removes water by the centrifugal force of the inner tub. At the dry cycle, the load of clothes is dehumidified by heat.

Due to failure to correctly predict the time consumed for fully drying the laundry, the laundry may stay wet even after the dry cycle is done or, if the cycle goes on too long, the laundry may be damaged.

Therefore, a need exists for a way to precisely predict the time required for laundry to be fully dried to thereby prevent the laundry from being less dried, albeit the dry cycle is complete, or being over dried and thus damaged.

SUMMARY

The present disclosure aims to address the foregoing issues and/or needs.

An object of the present disclosure is to implement a method for precisely predicting the time required for letting wet clothes fully dried.

Another object of the present disclosure is to implement a method of training a time prediction model by obtaining sampled data of information related to the dry state of the laundry.

According to an embodiment of the present disclosure, a method for drying laundry comprises training a time prediction model for obtaining first remaining time information related to complete dryness of the laundry, obtaining first washer state information related to a state of a washer for drying the laundry, obtaining the first remaining time information by inputting the first washer state information to the trained time prediction model, and drying the laundry based on the obtained first remaining time information.

Obtaining the first washer state information may include obtaining first operation information related to an operation of the washer and first internal state information related to an internal state of the washer via a sensor of the washer and obtaining the first washer state information by sampling at least one of the first operation information or the first internal state information at every predetermined period.

The first internal state information may include at least one of pieces of information related to a first water level in a water container of the washer, a first internal humidity of the washer, or a first internal temperature distribution.

The first operation information may include at least one of pieces of information related to a first revolutions per minute (RPM) of an inner tub of the washer, a first motor current of the washer, and a first heating temperature of a heater.

Training the time prediction model may include obtaining a terminate-drying condition of the washer, obtaining a plurality of state-time training sets based on the terminate-drying condition, and training the time prediction model with the plurality of state-time training sets, and wherein the plurality of state-time training sets include a plurality of pieces of second washer state information and a plurality of pieces of second remaining time information each of which is related to a respective one of the plurality of pieces of second washer state information.

Obtaining the plurality of state-time training sets may include obtaining the plurality of pieces of second washer state information by sampling, at each predetermined period, at least one of second operation information related to the operation of the washer and second internal state information related to the internal state of the washer while drying particular laundry until the terminate-drying condition is met, obtaining the plurality of pieces of second remaining time information based on the predetermined period and a time consumed from a start time of drying the particular laundry to a time when the terminate-drying condition is met, and obtaining the plurality of state-time training sets by labeling the plurality of pieces of second internal state information with the plurality of pieces of second remaining time information.

Obtaining the first remaining time information may include receiving, from a network, downlink control information (DCI) used for scheduling transmission of the first washer state information, and wherein the first washer state information may be transmitted to the network based on the DCI.

The method may further comprise performing an initial access procedure with the network based on a synchronization signal block (SSB), wherein the first washer state information may be transmitted to the network via a physical uplink shared channel (PUSCH), and wherein dedicated demodulation reference signals (DM-RSs) of the SSB and the PUSCH may be quasi co-located (QCL) for QCL type D.

The method may further comprise controlling a transceiver to transmit the first washer state information to an artificial intelligence (AI) processor included in the network and controlling the transceiver to receive AI-processed information from the AI processor, wherein the AI-processed information may include information related to the first remaining time.

According to an embodiment of the present disclosure, an intelligent washer may comprise a washing tub, an inner tub included in the washing tub, laundry seated in the inner tub, a motor transferring a rotation force to the inner tub, a sensor obtaining internal state information for the washer to a processor, a display displaying first remaining time information related to complete dryness of the laundry, and the processor training a time prediction model for obtaining the first remaining time information related to complete dryness of the laundry, control the sensor to obtain first washer state information related to a state of the washer for drying the laundry, obtaining the first remaining time information by inputting the first washer state information to the trained time prediction model, and controlling the washing tub to dry the laundry based on the obtained first remaining time information.

To obtain the first washer state information, the processor may control the sensor of the washer to obtain first operation information related to an operation of the washer and first internal state information related to an internal state of the washer and sample at least one of the first operation information or the first internal state information at every predetermined period.

The first internal state information may include at least one of pieces of information related to a first water level in a water container of the washer, a first internal humidity of the washer, or a first internal temperature distribution.

The first operation information may include at least one of pieces of information related to a first revolutions per minute (RPM) of an inner tub of the washer, a first motor current of the washer, and a first heating temperature of a heater.

To train the time prediction model, the processor may obtain a terminate-drying condition of the washer, obtain a plurality of state-time training sets based on the terminate-drying condition, and train the time prediction model with the plurality of state-time training sets, and wherein the plurality of state-time training sets may include a plurality of pieces of second washer state information and a plurality of pieces of second remaining time information each of which is related to a respective one of the plurality of pieces of second washer state information.

To obtain the plurality of pieces of state-time training sets, the processor may obtain the plurality of pieces of second washer state information by sampling, at each predetermined period, at least one of second operation information related to the operation of the washer and second internal state information related to the internal state of the washer while drying particular laundry until the terminate-drying condition is met, wherein the processor may obtain the plurality of pieces of second remaining time information based on the predetermined period and a time consumed from a start time of drying the particular laundry to a time when the terminate-drying condition is met, and the processor may obtain the plurality of state-time training sets by labeling the plurality of pieces of second internal state information with the plurality of pieces of second remaining time information.

The intelligent washer may further comprise a transceiver, wherein to obtain the first remaining time information, the processor may control the transceiver to receive, from a network, downlink control information (DCI) used for scheduling transmission of the first washer state information, and wherein the first washer state information may be transmitted to the network based on the DCI.

The processor may control the transceiver to perform an initial access procedure with the network based on a synchronization signal block (SSB) through the transceiver, wherein the first washer state information may be transmitted to the network via a physical uplink shared channel (PUSCH), and wherein dedicated demodulation reference signals (DM-RSs) of the SSB and the PUSCH may be quasi co-located (QCL) for QCL type D.

The processor may control the transceiver to transmit the first washer state information to an artificial intelligence (AI) processor included in the network, wherein the processor may control the transceiver to receive AI-processed information from the AI processor, and the AI-processed information may be information related to the first remaining time.

According to an embodiment of the present disclosure, a method and apparatus for drying laundry using an AI device provide the following effects.

An embodiment of the present disclosure may precisely predict the time required for complete dryness of wet laundry.

An embodiment of the present disclosure may obtain sampled data of information related to the dry state of laundry.

Effects of the present disclosure are not limited to the foregoing, and other unmentioned effects would be apparent to one of ordinary skill in the art from the following description.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, embodiments of the disclosure will be described in detail with reference to the attached drawings.

The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
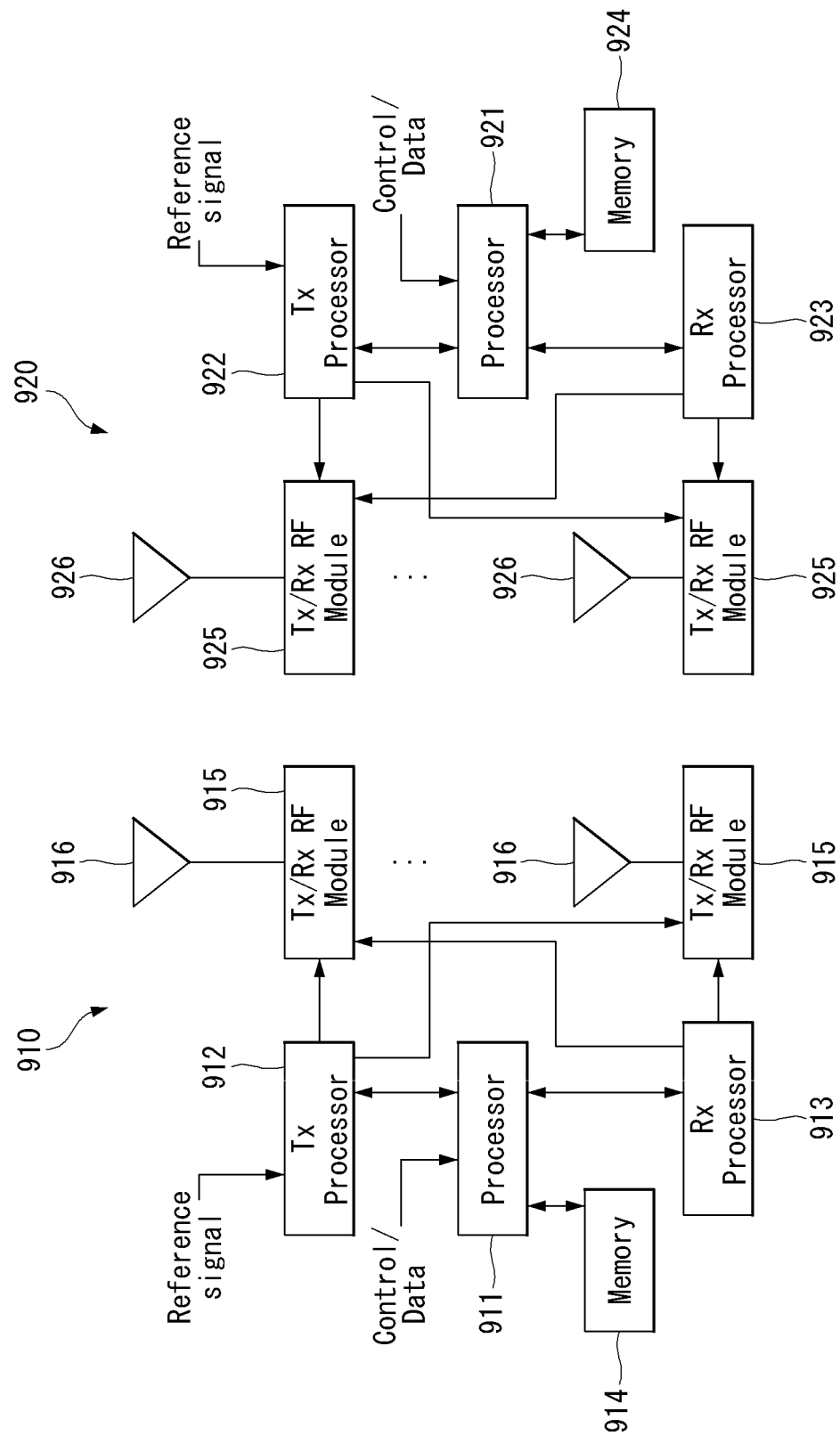
FIG. 1 is a block diagram illustrating a configuration of a wireless communication system to which methods proposed herein may apply.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
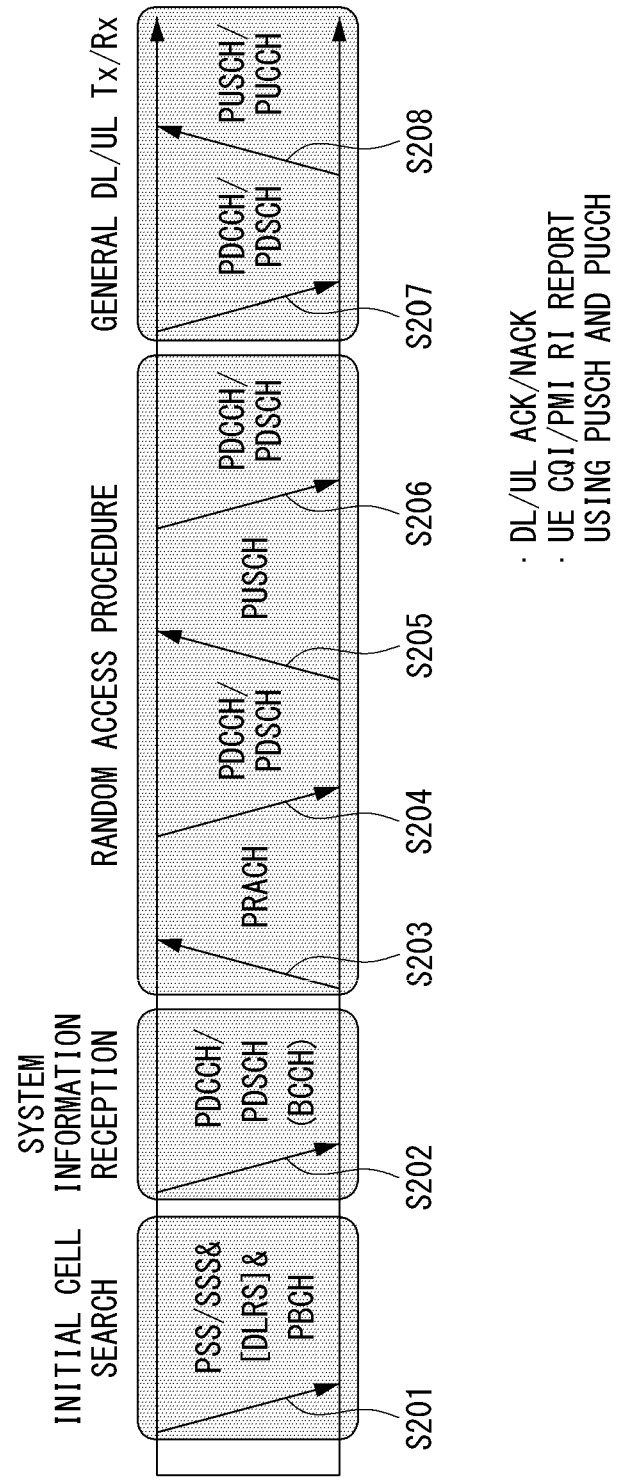
FIG. 2 is a view illustrating an example method of transmitting/receiving signals in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

D. Basic Operation Between Autonomous Vehicles Using 5G Communication

Figure 3:
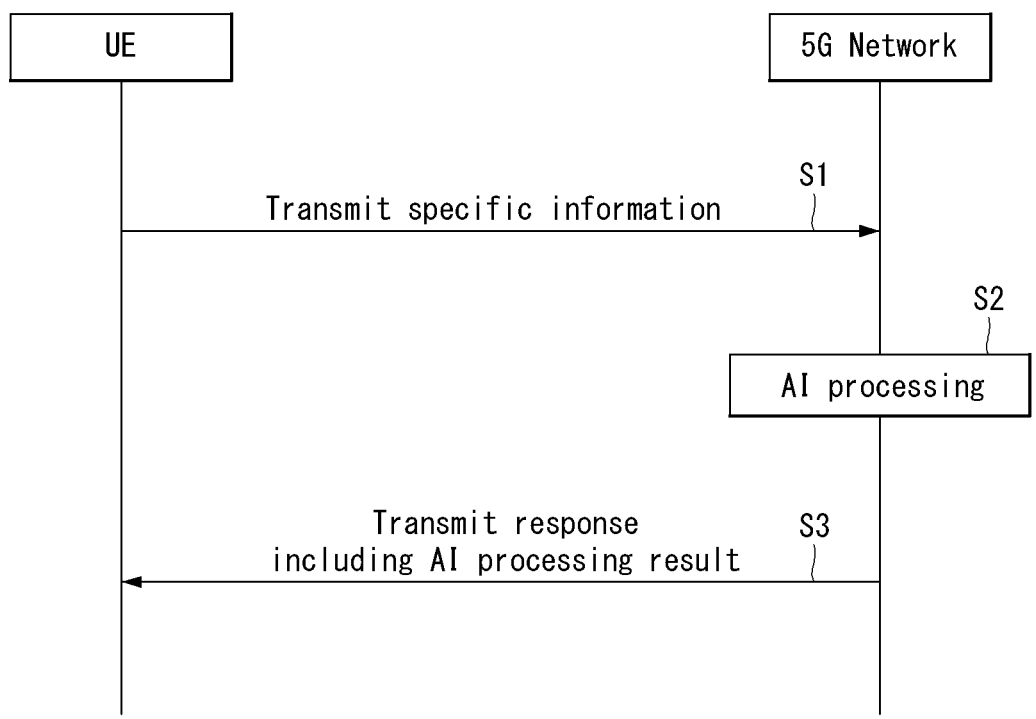
FIG. 3 is a view illustrating example basic operations of a user terminal and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

E. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

The above-described 5G communication technology can be combined with methods proposed in the present disclosure which will be described later and applied or can complement the methods proposed in the present disclosure to make technical features of the methods concrete and clear.

A method for drying laundry using an AI device

For a laundry wash, a washer typically undergoes a washing cycle, a spin cycle, and a dry cycle. The washing cycle rotates the inner tub of the washer to remove dirt and stains from a load of clothing (laundry). The spin cycle removes water by the centrifugal force of the inner tub. At the dry cycle, the load of clothes is dehumidified by heat.

According to the prior art, the user herself sets a dry time and the dry cycle runs during the time set by the user. However, due to failure to correctly predict the time consumed for completely drying the laundry, the laundry may stay wet even after the dry cycle is done or, if the cycle goes on too long, the laundry may be damaged. According to the prior art, whether the laundry is dried or not is predicted simply via a humidity sensor.

To address the foregoing issues, according to the present disclosure, there is provided a laundry drying method using an AI device which may precisely and accurately predict the time required for laundry to be fully dried to thereby prevent the laundry from being less dried, albeit the dry cycle is complete, or being over dried and thus damaged.

Figure 4:
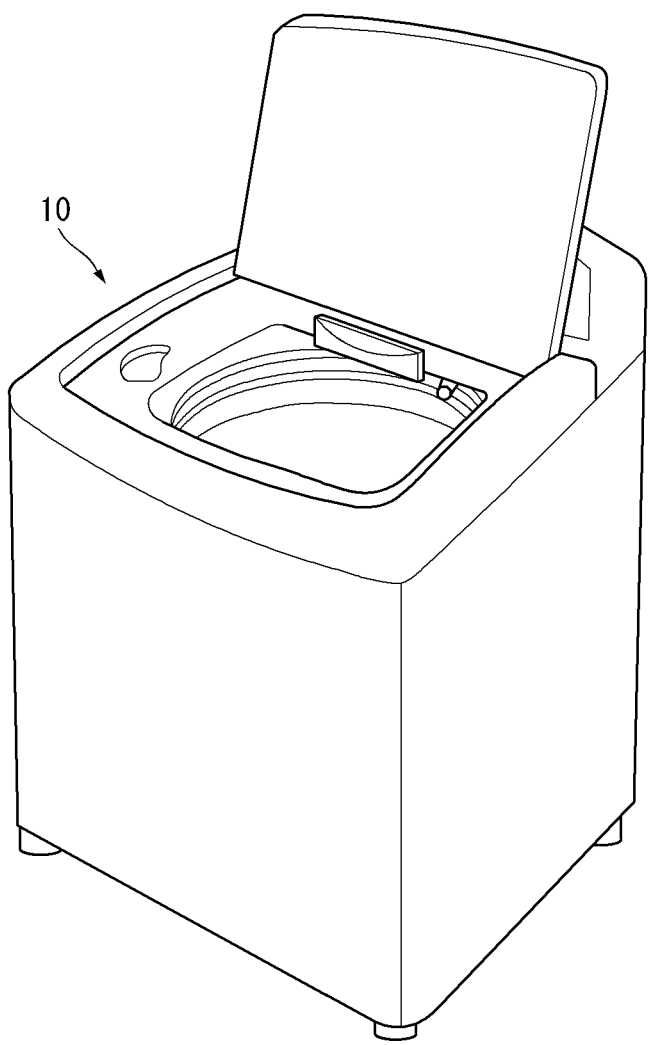
FIGS. 4 and 5 are views illustrating an intelligent washer according to an embodiment of the present disclosure.
Figure 5:
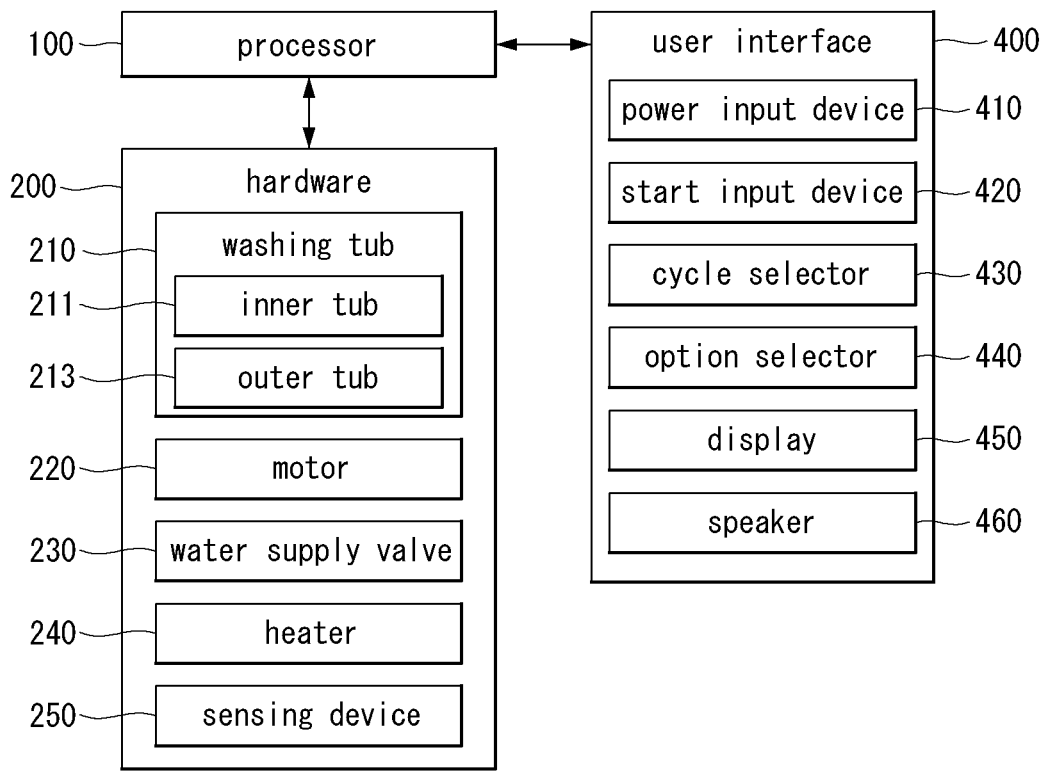

FIG. 4 is a view illustrating an intelligent washer according to an embodiment of the present disclosure. FIG. 5 is a block diagram illustrating major components of the washer of FIG. 4.

Referring to FIGS. 4 and 5, according to an embodiment, a washer 10 includes a processor 100, hardware 200, and a user interface 400.

The processor 100 controls the hardware 200 according to information input via the user interface 400, thereby controlling the overall operation of the washer 10. The processor 100 obtains information related to the dryness state of the laundry via a sensing device 250 included in the hardware 200 and obtains information related to the operation state of the washer 10 via a washing tub 210, a motor 220, or a heater 240. The processor 100 samples the obtained information and controls the operation of the hardware 200 based on the sampled information.

Specifically, the processor 100 may analyze laundry put and seated in an inner tub 211, thereby extracting sampling features related to the dryness of the laundry. More specifically, the sampling features include features related to the operation of the intelligent washer 10 and features related to the dryness of the laundry. The features related to the operation of the intelligent washer 10 include the revolutions per minute (RPM) of the inner tub 211, the current of the motor 220, and the heating temperature of the heater 240, and the features related to the dryness of the laundry include the water level of the water container of the intelligent washer 10, the humidity inside the inner tub 211, and the thermal infrared temperature distribution of the laundry.

The processor 100 may sample the features and calculate and predict a complete dryness remaining time that is a time necessary for completely drying the laundry put and seated in the inner tub 211.

The hardware 200 may include the washing tub 210, the motor 220, a water supply valve 230, the heater 240, and the sensing device 250.

The washing tub 210 includes an outer tub 213 which contains wash water and the inner tub 211 which is disposed inside of the outer tub 213 to receive laundry and is spun by the rotating power received from the motor 220. The water supply valve 230 controls the supply of wash water. The heater 240 heats the water in the washing tub 210. The sensing device 250 detects the dryness state of the laundry seated in the inner tub 211.

The user interface 400 may include a power input device 410, a start input device 420, a cycle selector 430, an option selector 440, a display 450, and a speaker 460.

The power input device 410 provides a means for controlling the on/off of the main power source of the washer 10. The start input device 420 provides a means for controlling the start of the wash cycle, rinse cycle, or spin cycle. The cycle selector 430 provides a means for selecting the type of the wash cycle, rinse cycle, or spin cycle. The option selector 440 provides a means for selecting detailed options to proceed with the wash, rinse, or spin cycle. For example, the option selector 440 may be a means for selecting options, such as water temperature, time, or reservation. The display 450 may display the operation state of the washer 10, course information selected by the user via the cycle selector 430, option information selected via the option selector 440, or time necessary to completely dry the laundry. The speaker 460 outputs the operation state of the washer 10 or a circumstance for a particular event in a voice signal. The particular event may be a circumstance for laundry distribution control or RPM control based on a laundry image.

Figure 6:
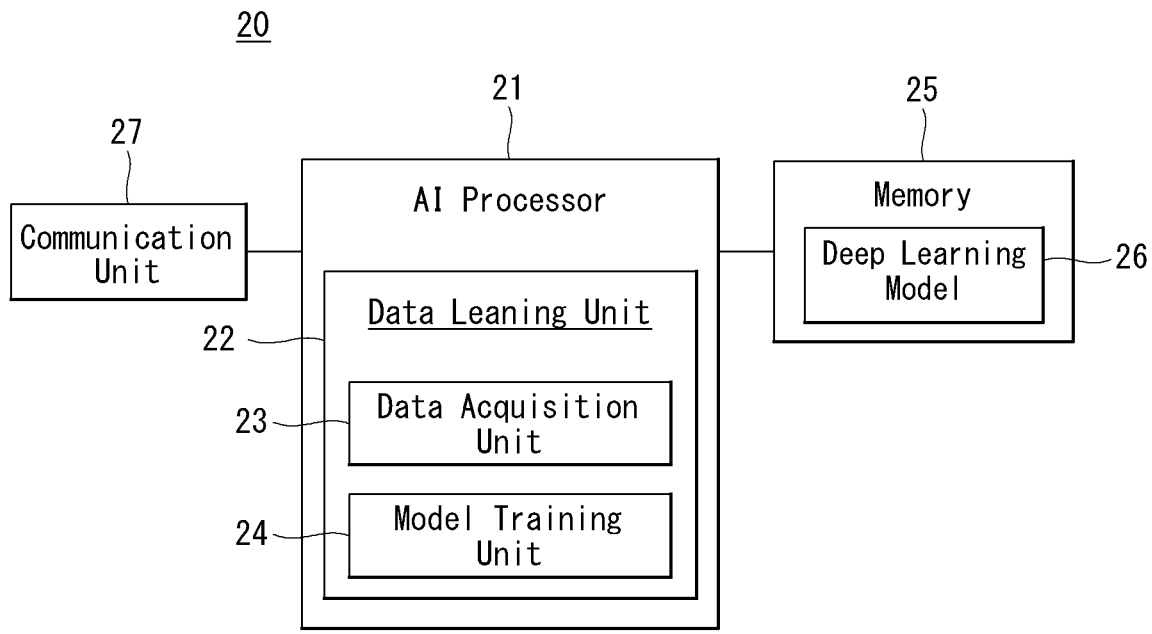
FIG. 6 is a block diagram illustrating an AI device according to an embodiment of the present disclosure.

FIG. 6 is a block diagram illustrating an AI device according to an embodiment of the present disclosure.

Referring to FIG. 6, an AI device 20 may include an electronic device including an AI module capable of AI processing or a server including an AI module. The AI device 20 may be included as at least a component of the washer 10 of FIGS. 4 and 5 so that the AI device 20 may perform at least part of AI processing along therewith.

AI processing may include all operations related to the processor 100 of the washer 10 of FIG. 4. For example, the washer 10 perform AI processing the laundry image or laundry classification information or laundry distribution information, thereby performing processing/determination and generating control signals.

The AI device 20 may be a client device which directly uses the results of AI processing or a cloud-environment device which provides the results of AI processing to other devices. The AI device 20 may be a computing device capable of training neural networks and may be implemented as at least one of various electronic devices, such as servers, desktop PCs, laptop computers, or tablet PCs.

The AI device 20 may include an AI processor 21, a memory 25, and/or a transceiver 27.

The AI processor 21 may train the ANN based on the program stored in the memory 25. In particular, the AI processor 21 may train a neural network for recognizing relevant data of the washer 10. The neural network for recognizing the relevant data of the washer 10 may be designed to mimic the human brain on the computer and may include a plurality of weighted network nodes which mimic the neurons of the human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted Boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SSD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The transceiver 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the transceiver 27, etc., but it should be noted that the aforementioned components may be integrated in one module and referred to as an AI module.

Figure 7:
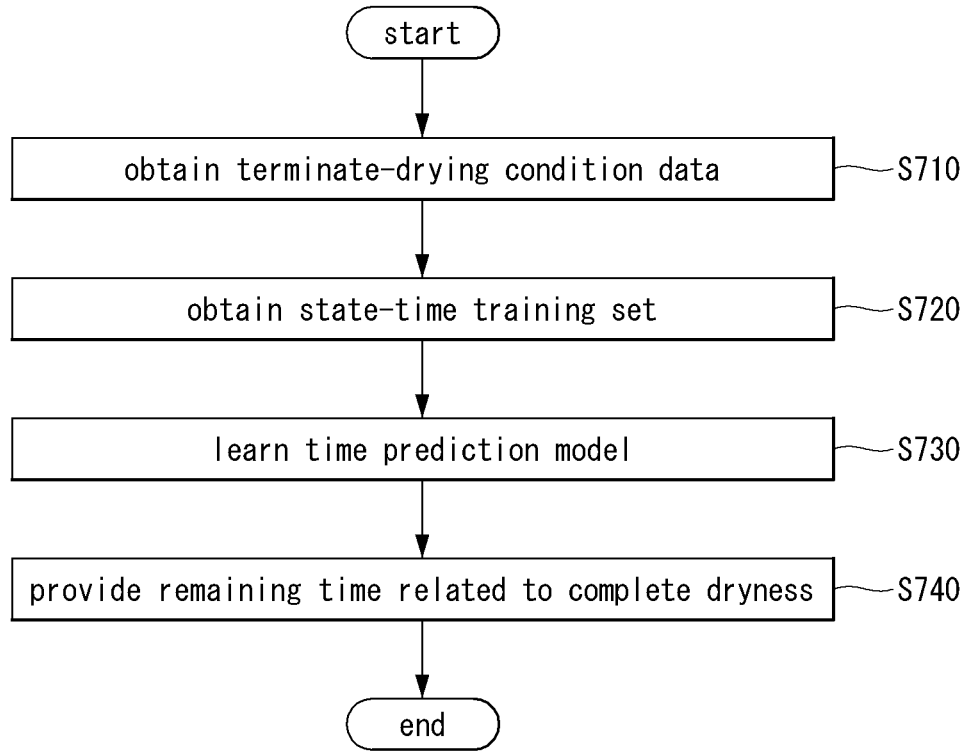
FIG. 7 is a flowchart illustrating an example method for drying laundry using an AI device according to an embodiment of the present disclosure.

FIG. 7 is a flowchart illustrating an example method for drying laundry using an AI device according to an embodiment of the present disclosure.

FIG. 7 schematically illustrates operations of a laundry drying method using an intelligent washer according to an embodiment of the present disclosure.

The processor 100 obtains data related to a terminate-drying condition (hereinafter, terminate-drying condition data) which is a condition for completely drying wet laundry (S710). The obtained data may be stored in a memory included in the processor 100.

Obtaining the terminate-drying condition data, the processor 100 obtains a state-time training set for training an artificial intelligence (AI) model for predicting a laundry complete dryness remaining time which is a time necessary for complete dryness of the laundry based on the obtained terminate-drying condition data (S720). The obtained state-time training set may be stored in the memory included in the processor 100.

The processor 100 trains the AI model (hereinafter, a time prediction model) for predicting the complete dryness remaining time based on the state-time training set and the terminate-drying condition data (S730).

Where wet laundry is put in the inner tub 211 of the washing tub 210, the processor 100 provides the remaining time related to the complete dryness of the laundry based on an always-on time prediction model to be trained (S740).

Steps S710 to S740 are described below in greater detail.

Figure 8:
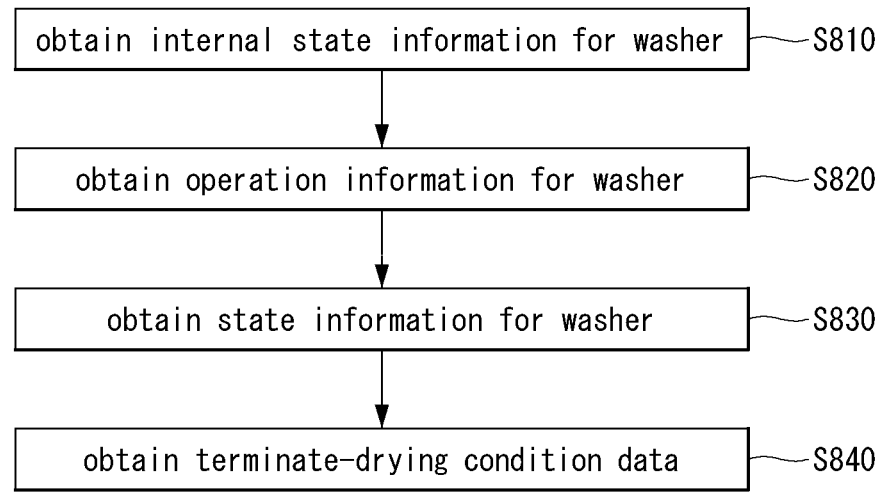
FIG. 8 is a flowchart illustrating an example method for drying laundry using an intelligent washer according to an embodiment of the present disclosure.

FIG. 8 is a flowchart illustrating an example method for drying laundry using an intelligent washer according to an embodiment of the present disclosure.

FIG. 8 specifically illustrates the step of obtaining the terminate-drying condition data by the processor 100.

Although not shown in FIG. 8, completely dried laundry is put in the inner tub 211 of the intelligent washer 10, and the processor 100 performs the laundry drying operation. The steps described below may be carried out while the washer performs the drying operation.

The processor 100 obtains internal state information related to the internal state of the washer, which is detected by the sensing device 250 provided in the intelligent washer 10, from the sensing device 250 (S810). The internal state information includes the water level in the water container of the intelligent washer 10, the humidity inside the inner tub 211, and the thermal infrared (IR) temperature distribution of the laundry. The completely dried laundry may include various laundry levels of laundry, and the processor 100 may grasp the various laundry levels of laundry via the sensing device 250.

The processor 100 obtains washer operation information from the washing tub 210, the motor 220, or the heater 240 (S820). The washer operation information includes the revolutions per minute (RPM) of the inner tub 211 of the washing tub 210, the current of the motor 220, and the heating temperature of the heater 240.

Steps S810 and S820 may be performed simultaneously or in inverse order.

The processor 100 extracts sampling features of the laundry by sampling the washer operation information and the information about the completely dried laundry (S830). Sampling means obtaining a particular value of temporally continuous data at a particular time, repeatedly at predetermined intervals. The sampling features may also be referred to as 'washer state information.'

The washer state information is information resultant from sampling the internal state information and the operation information. Thus, the washer state information includes the sampled data of the internal state information and operation information. Sampling may be performed repeatedly at predetermined intervals, and each interval may be 0.1 seconds.

The controller 100 obtains the terminate-drying condition data based on the washer state information (S840). In this case, the controller 100 may store the terminate-drying condition data in the memory.

Figure 9:
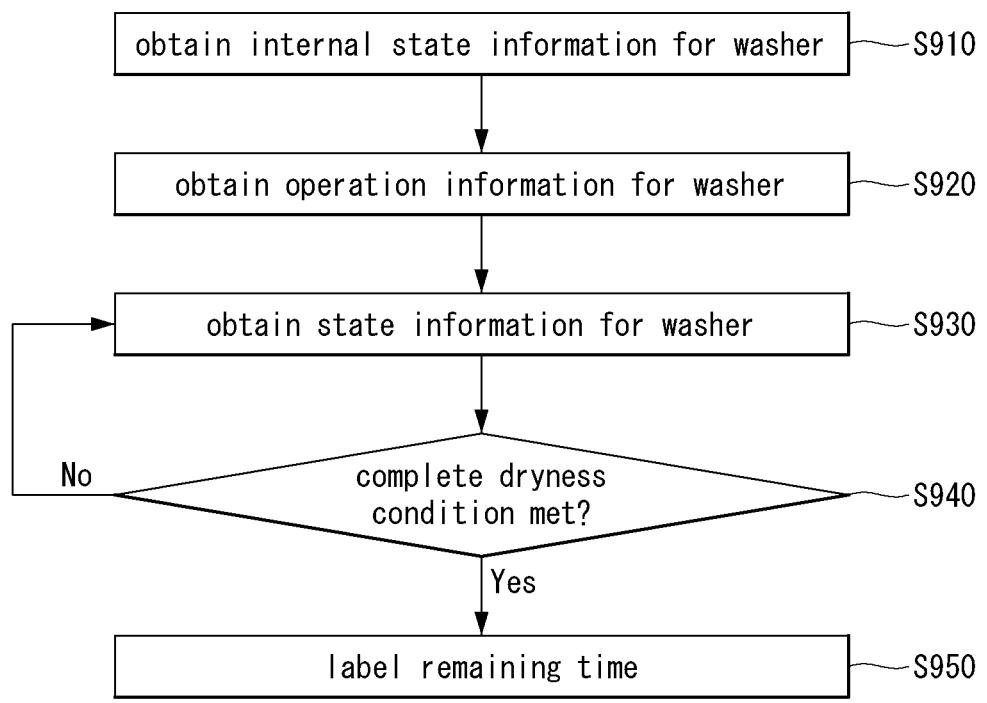
FIG. 9 is a flowchart illustrating an example method for drying laundry using an intelligent washer according to an embodiment of the present disclosure.

FIG. 9 is a flowchart illustrating an example method for drying laundry using an intelligent washer according to an embodiment of the present disclosure.

FIG. 9 specifically illustrates the step of obtaining a state-time training set for training a time prediction model by the controller 100.

Although not shown in FIG. 9, incompletely dried laundry is put in the inner tub 211 of the intelligent washer 10, and the controller 100 performs the laundry drying operation. The steps described below may be carried out while the washer performs the drying operation.

The controller 100 obtains internal state information detected by the sensing device 250 provided in the intelligent washer 10, from the sensing device 250 (S910). The internal state information includes the water level in the water container of the intelligent washer 10, the humidity inside the inner tub 211, and the thermal infrared (IR) temperature distribution of the laundry. The completely dried laundry may include various laundry levels of laundry, and the controller 100 may grasp the various laundry levels of laundry via the sensing device 250.

The controller 100 obtains washer operation information from the washing tub 210, the motor 220, or the heater 240 (S920). The washer operation information includes the revolutions per minute (RPM) of the inner tub 211 of the washing tub 210, the current of the motor 220, and the heating temperature of the heater 240.

Steps S910 and S920 may be performed simultaneously or in inverse order.

The controller 100 samples the internal state information and the operation information, thereby obtaining the washer state information (S930). Sampling may be performed using a particular number of frames.

The washer state information is information resultant from sampling the internal state information and the operation information. Thus, the washer state information includes the sampled data of the internal state information and operation information. Sampling may be performed repeatedly at predetermined intervals, and each interval may be 0.1 seconds. The number of the pieces of washer state information may be varied depending on the number of times of sampling. For example, if sampling is performed 100 times from the start time of drying to the end time, the number of pieces of washer state information corresponding thereto may be 100.

The controller 100 determines whether the washer state information meets the terminate-drying condition (S940). A particular method for determining whether the washer state information meets the terminate-drying condition is described below with reference to FIG. 10.

When the washer state information is determined not to meet the terminate-drying condition, step S930 is performed. In contrast, when the washer state information is determined to meet the terminate-drying condition, the controller 100 labels each piece of washer state information with a respective corresponding piece of remaining time information (S950).

A specific method for labeling the washer state information with the remaining time information is described below with reference to FIG. 11.

By performing the steps above, the controller 100 obtains the state-time training set which is data for training the time prediction model. The state-time training set is information resultant from matching the washer state information with the remaining time information. Thus, as a result of performing the steps, a plurality of state-time training sets may be obtained. The controller 100 may store the plurality of state-time training sets in the memory.

Figure 10:
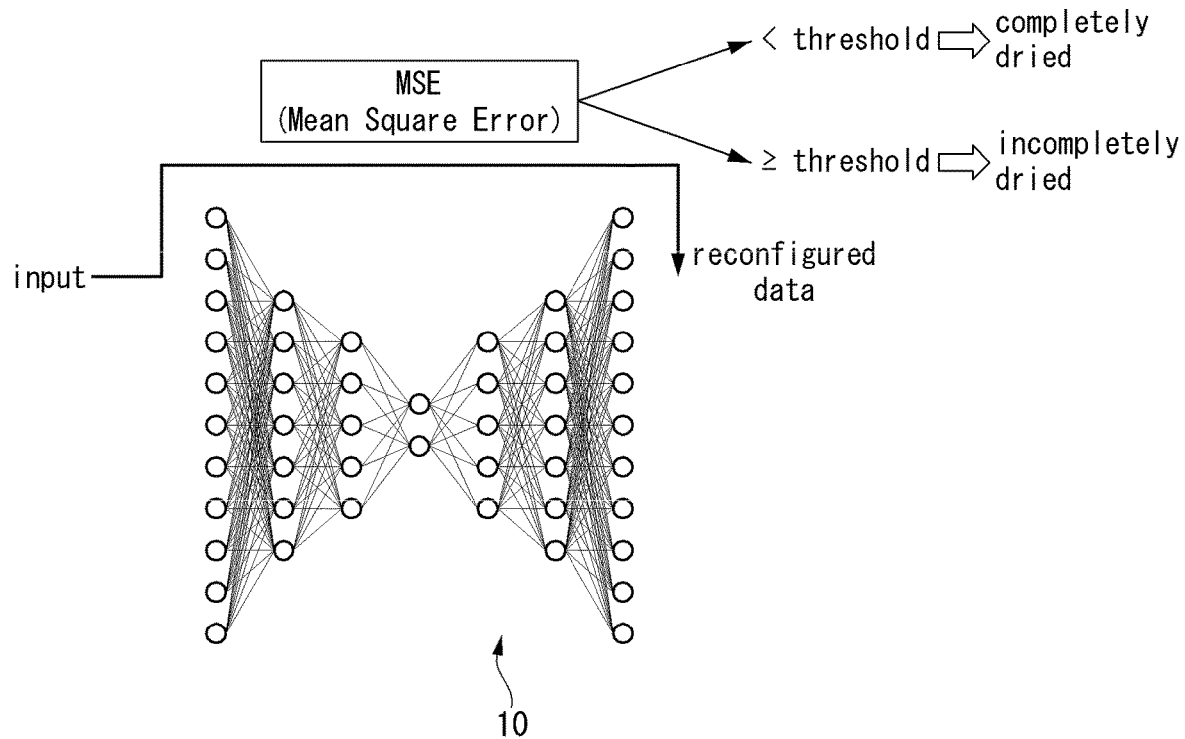
FIG. 10 is a view illustrating an example method for drying laundry using an intelligent washer according to an embodiment of the present disclosure.

FIG. 10 is a view illustrating an example method for drying laundry using an intelligent washer according to an embodiment of the present disclosure.

FIG. 10 specifically illustrates the operation of determining whether the washer state information meets the terminate-drying condition based on a terminate-drying condition identification model 1000 included in the controller 100.

The terminate-drying condition identification model 1000 receives the washer state information and obtains an output value for the received washer state information. As the output value is input back to the terminate-drying condition identification model 1000, a final output value, which is reconfigured data of the washer state information, is obtained.

Mean square error (MSE) analysis (error analysis) is applied to the reconfigured data. If the error between the reconfigured data and the terminate-drying condition is smaller than a particular threshold, the laundry is determined to be completely dried and, if the error is larger than the particular threshold, the laundry is determined to be incompletely dried.

Figure 11:
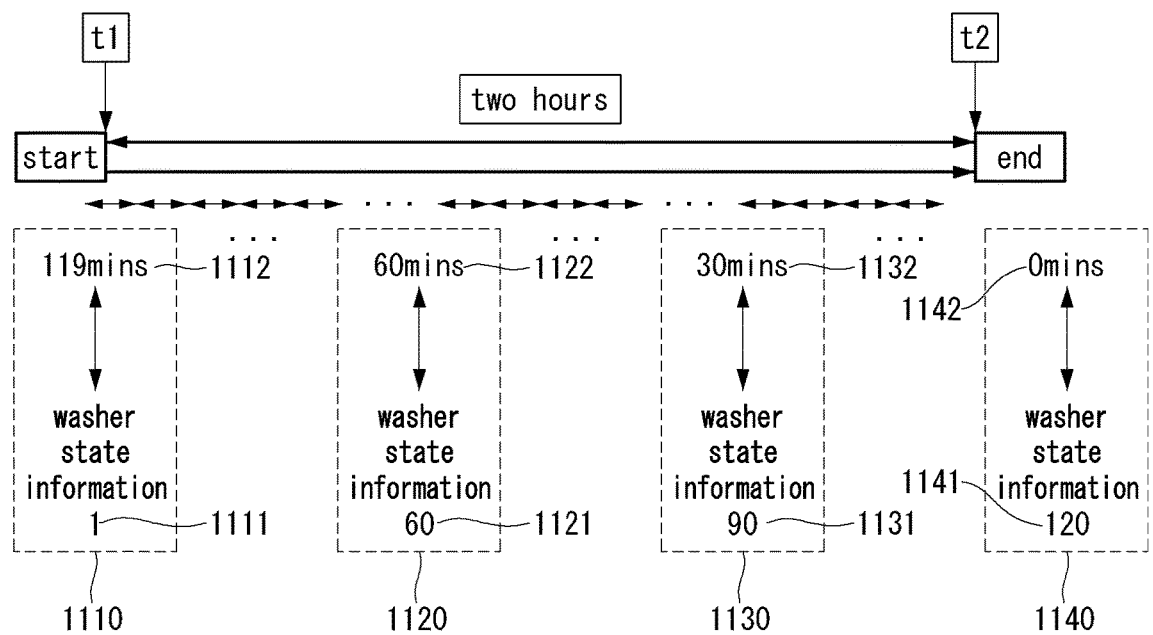
FIG. 11 is a view illustrating an example method for drying laundry using an intelligent washer according to an embodiment of the present disclosure.

FIG. 11 is a view illustrating an example method for drying laundry using an intelligent washer according to an embodiment of the present disclosure.

FIG. 11 particularly illustrates a method of labeling the washer state information with the remaining time by the controller 100, i.e., the step of obtaining the plurality of state-time training sets by the controller 100.

In FIG. 11, t1 denotes the time at which the controller 100 starts the drying operation on the incompletely dried laundry to obtain the plurality of state-time training sets, and t2 denotes the time at which the drying operation ends. Two hours are consumed from t1 to t2. For ease of description, FIG. 11 shows four pieces of remaining time information and four pieces of washer state information.

The controller 100 performs sampling at each predetermined period from t1 to t2, thereby obtaining a plurality of pieces of washer state information. For ease of description, the sampling period is one minute in FIG. 11. At t2, the laundry which used to be incompletely dried is completely dried, and the drying operation is terminated. To terminate the drying operation, the controller 100 may compare the terminate-drying condition with the washer state information 120 (1141) of FIG. 11 and determine that the washer state information 120 (1141) meets the terminate-drying condition. The controller 100 may obtain a plurality of pieces of washer state information from t1 to t2. In FIG. 11, since the controller 100 performs sampling every minute for two hours, the controller 100 may obtain 120 pieces of washer state information.

Since the controller 100 is aware of t2 and t1, the controller 100 may calculate the difference between t2 and t1, thereby calculating the time consumed until the drying operation is terminated. Calculating the consumed time, the controller 100 may obtain a plurality of pieces of remaining time information based on the sampling periods. Specifically, the controller 100 may obtain 120 pieces of remaining time information by dividing the consumed time by the sampling interval (one minute).

The controller 100 labels the plurality of pieces of washer state information with the plurality of pieces of remaining time information, thereby obtaining a plurality of state-time training sets. Specifically, the controller 100 labels 120 pieces of washer state information with 120 pieces of remaining time information, thereby obtaining 120 state-time training sets. Referring to FIG. 11, washer state information 1 is labeled with a remaining time of 119 minutes, washer state information 60 is labeled with a remaining time of 60 minutes, washer state information 90 is labeled with a remaining time of 30 minutes, and washer state information 120 is labeled with a remaining time of zero minutes (end time). Thus obtained are state-time training sets, such as (washer state information 1-remaining time information 1 (119 minutes) and (washer state information 60-remaining time information 2 (remaining time of 60 minutes). The controller 100 may obtain the plurality of state-time training sets by the above method and train the time prediction model with the correspondence information.

Figure 12A:
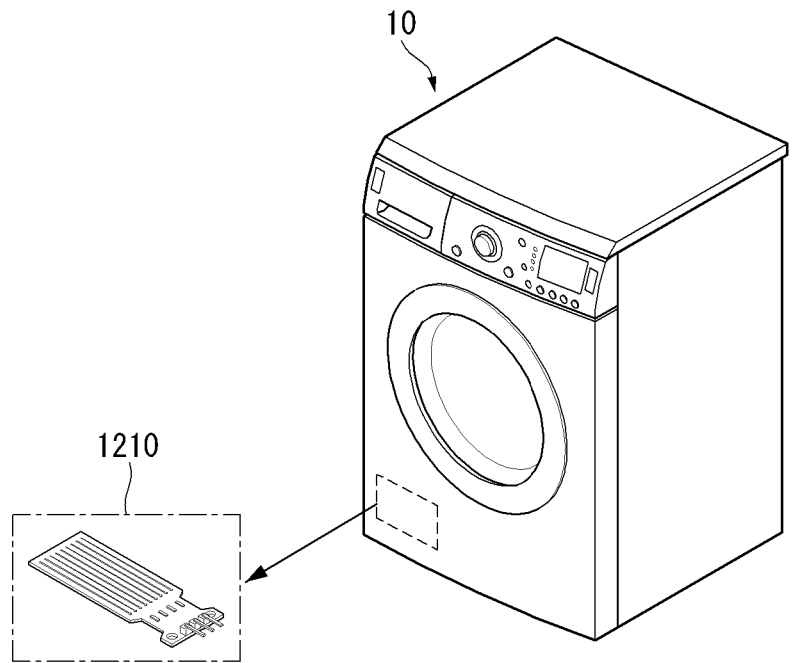
FIGS. 12A and 12B are views illustrating an example method for drying laundry using an intelligent washer according to an embodiment of the present disclosure.
Figure 12B:
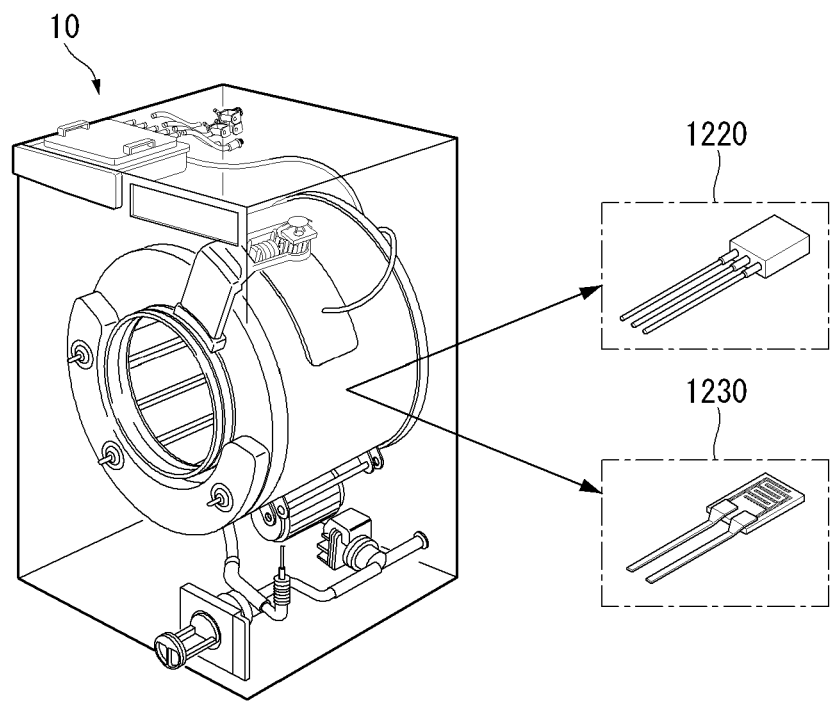

FIGS. 12A and 12B are views illustrating an example method for drying laundry using an intelligent washer according to an embodiment of the present disclosure.

FIGS. 12A and 12B specifically illustrate a method of obtaining internal state information for a washer by sensors included in the sensing device 250 and sampling the obtained internal state information to thereby obtain washer state information.

FIG. 12A illustrates a water container water level sensor 1210 provided in the intelligent washer 10. The water container water level sensor 1210 may be positioned in the water container of the intelligent washer 10. The water container water level sensor 1210 may detect the water level in the water container and transfer the detected water level information to the controller 100. The controller 100 may perform sampling on the received water level information (e.g., internal state information), thereby obtaining a sampling feature (e.g., washer state information) for the water level in the water container.

FIG. 12B illustrates a thermal IR sensor 1220 and a humidity sensor 1230 provided in the intelligent washer 10. The thermal IR sensor 1220 may be positioned in the center of the back surface of the inner tub 211 of the washing tub 210 in the intelligent washer 10. The thermal IR sensor 1220 may detect the thermal IR temperature distribution of the laundry and transfer the detected information (e.g., internal state information) to the controller 100. The controller 100 samples the received thermal IR temperature distribution information, obtaining a sampling feature (e.g., washer state information) for the thermal IR temperature distribution.

The humidity sensor 1220 may be positioned in the center of the back surface of the inner tub 211 of the washing tub 210 in the intelligent washer 10. The humidity sensor 1220 may detect the humidity inside the inner tub and transfer the detected information (e.g., internal state information) to the controller 100. The controller 100 samples the received humidity information, obtaining a sampling feature (e.g., washer state information) for the humidity inside the inner tub.

In addition to the internal state information transferred by the sensing device 250 to the controller 100, the operation information for the intelligent washer 10 may be transferred to the controller 100 by at least one of the motor 220, the washing tub 210, or the heater 240. The controller 100 samples the internal state information and the operation information for the intelligent washer 10, thereby obtaining the washer state information.

Figure 13A:
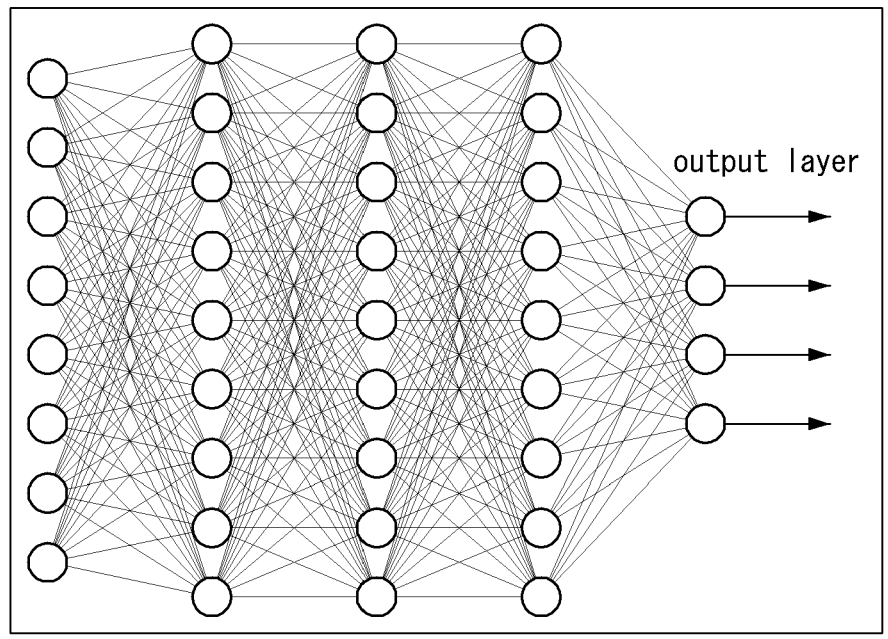
FIGS. 13A and 13B are views illustrating an example method for drying laundry using an intelligent washer according to an embodiment of the present disclosure.
Figure 13B:
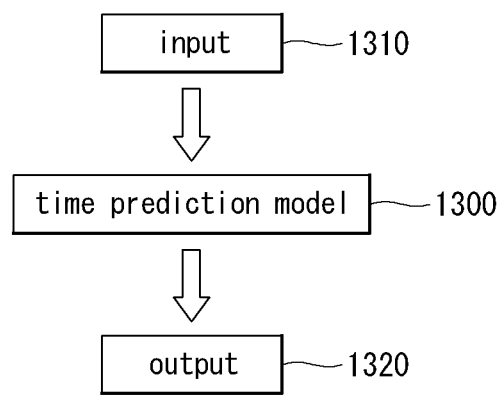

FIGS. 13A and 13B are views illustrating an example method for drying laundry using an intelligent washer according to an embodiment of the present disclosure.

FIGS. 13A and 13B illustrate the step of training the time prediction model with terminate-drying condition data and a plurality of state-time training sets by the controller 100.

FIG. 13A illustrates an example time prediction model. The time prediction model may be trained to receive particular values and output output values corresponding to the received particular values. The received values, also referred to as input values, may be washer state information, and the output values may be remaining times necessary for complete dryness of laundry.

Specifically, the time prediction model may learn the relationship between the input values and the output values and, when a particular input value is received after learning is done, the time prediction model may output the output value corresponding to the particular input value based on the learned input-output relationship.

The time prediction model may be included in the controller 100. The time prediction model may be a regression model.

FIG. 13B specifically illustrates the step of training the time prediction model with terminate-drying condition data and a plurality of state-time training sets by the controller 100.

The time prediction model learns the plurality of state-time training sets and learns the relationship between at least one piece of washer state information and at least one piece of remaining time information using at least one piece of washer state information included in the plurality of state-time training sets, as an input value, and at least one piece of remaining time information, as an output value. The washer state information includes the revolutions per minute (RPM) of the inner tub 211, the current of the motor 220, and the heating temperature of the heater 240, as related to the operation of the intelligent washer 10, and the water level of the water container of the intelligent washer 10, the humidity inside the inner tub 211, and the thermal infrared temperature distribution of the laundry, as related to the drying of the laundry.

Figure 14:
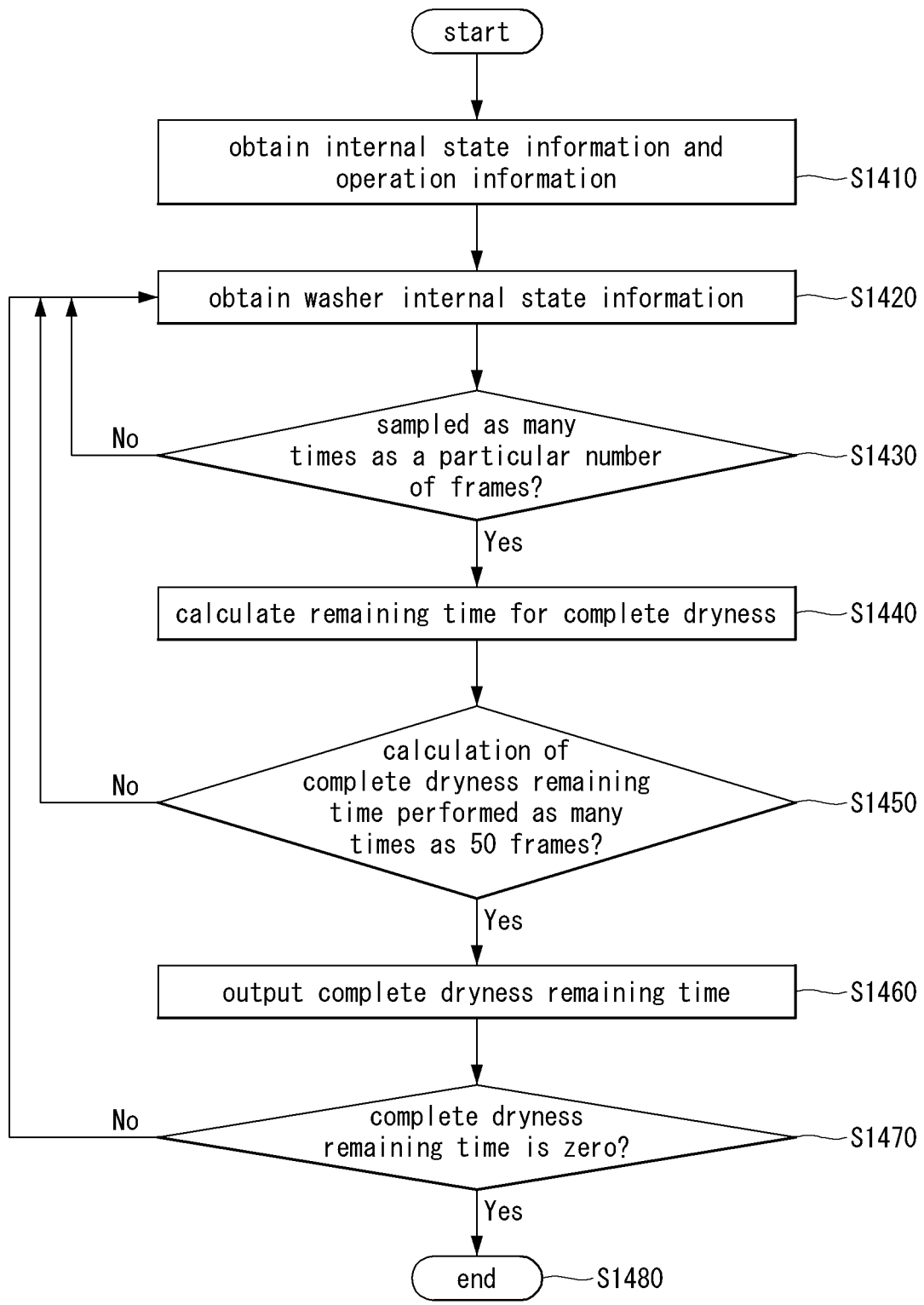
FIG. 14 is a flowchart illustrating an example method for drying laundry using an AI device according to an embodiment of the present disclosure.

FIG. 14 is a flowchart illustrating an example method for drying laundry using an AI device according to an embodiment of the present disclosure.

Referring to FIG. 14, the controller 100 controls the sensing device 250 to obtain information necessary for sampling, thereby obtaining the internal state information for the washer, which is related to the laundry seated in the inner tub 211 of the washer 10, and operation information for the washer, which is related to the operation of the washer 10 (S1410).

The controller 100 obtains the washer state information by sampling the operation information and internal state information obtained from the sensing device 250 (S1420).

The controller 100 determines whether the washer state information is sampled as many times as a particular number of frames (S1430). One of the pieces of data (washer state information) sampled as many times as the particular number of frames corresponds to one state.

Upon determining that the washer state information has not been sampled as many times as the particular number of frames, the controller 100 performs sampling on the internal state information and the operation information.

In contrast, upon determining that the washer state information has been sampled as many times as the particular number of frames, the controller 100 calculates a complete dryness remaining time (referred to as a first complete dryness remaining time) (S1440).

To stably output the calculated complete dryness remaining time, the controller 100 determines whether the complete dryness remaining time has been calculated as many times as the particular number of frames (S1450). The particular number may be 50.

Upon determining that the complete dryness remaining time has not been calculated as many times as the particular number of frames, the controller 100 repeats steps S1420 and its subsequent steps.

On the contrary, upon determining that the complete dryness remaining time has been calculated as many times as the particular number of frames, the controller 100 outputs the complete dryness remaining time (referred to as a second complete dryness remaining time) (S1460). The output complete dryness remaining time (second complete dryness remaining time) may be obtained by calculating as many complete dryness remaining times as the particular number of frames based on the washer state information in step S1440 and averaging as many complete dryness remaining times (first complete dryness remaining time) as the particular number of frames. The complete dryness remaining time (second complete dryness remaining time) of step S1460, which is the average of as many complete dryness remaining times as the particular number of frames may be displayed on the display 450.

The complete dryness remaining time may stably be calculated by calculating as many complete dryness remaining times as the particular number of frames, rather than a single frame, and averaging the complete dryness remaining times whose number is the particular number of frames.

The controller 100 determines whether the complete dryness remaining time (second complete dryness remaining time) which is the average of as many complete dryness remaining times as the particular number of frames is zero (S1470). Unless the complete dryness remaining time is zero, the controller 100 repeats step S1420 and its subsequent steps.

In contrast, if the complete dryness remaining time is zero, the controller 100 terminates the drying operation (S1480).

Figure 15:
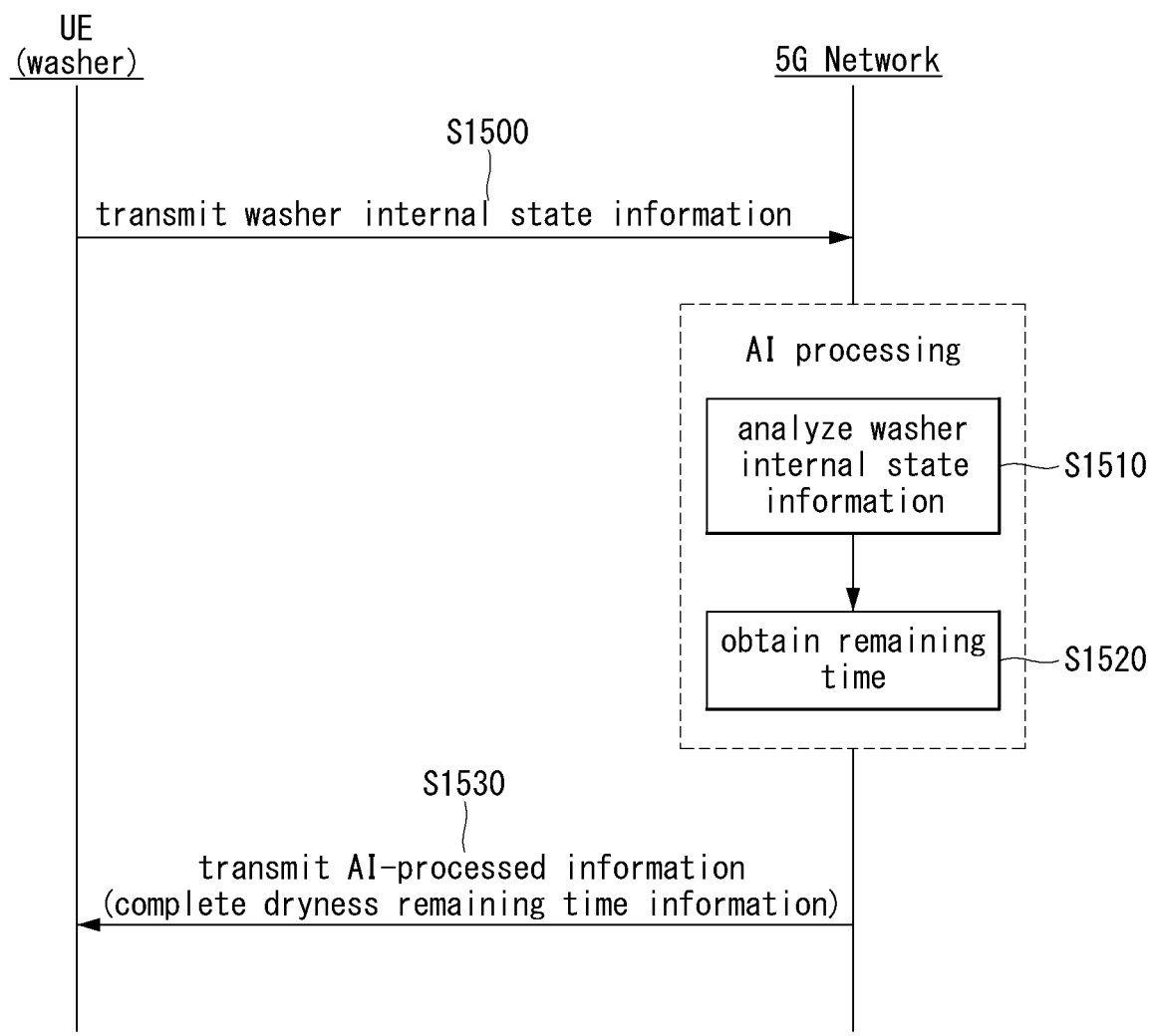
FIG. 15 is a flowchart illustrating an example method for drying laundry using an AI device according to an embodiment of the present disclosure.

FIG. 15 is a flowchart illustrating an example method for drying laundry using an AI device according to an embodiment of the present disclosure.

The controller 100 may control the transceiver to transmit washer state information for the intelligent washer 10 to the AI processor included in the 5G network. The controller 100 may control the transceiver to receive the AI-processed information from the AI processor. The AI-processed information may be information for the remaining time.

The controller 100 may transmit, to the network, the washer state information, in which the information related to the drying of the washer obtained by the sensing device 250 of the washer 10 has been sampled, based on downlink control information (DCI) (S1500). The washer state information may be transmitted to the network via a physical uplink shared channel (PUSCH), and the DM-RSs of the synchronization signal block (SSB) and PUSCH may be quasi co-located (QCL) for QCL type D.

The 5G network may include an AI processor or an AI system, and the AI system of the 5G network may perform AI processing based on the received information.

The controller 100 learns the terminate-drying condition for the laundry and, if sampling is performed on the laundry, the controller 100 generates washer state information and transmits the washer state information to the 5G network.

The AI system may analyze the washer state information received from the washer 10 (S1510). The AI system may obtain the remaining time necessary for complete dryness based on the result of analysis of the washer state information (S1520).

The 5G network may transmit the remaining time information necessary for complete dryness calculated by the AI system to the washer 10 via the wireless transceiver (S1530).

Figure 16:
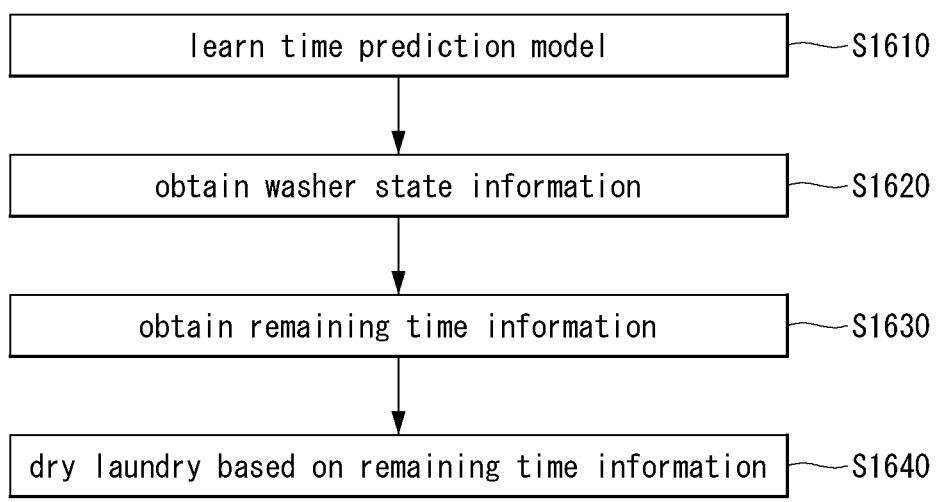
FIG. 16 is a flowchart illustrating an example method for drying laundry using an AI device according to an embodiment of the present disclosure.

FIG. 16 is a flowchart illustrating an example method for drying laundry using an AI device according to an embodiment of the present disclosure.

First, the controller 100 of the washer trains the time prediction model for obtaining first remaining time information related to the complete dryness of laundry.

Then, the controller 100 obtains first washer state information related to the state of the washer drying the laundry.

Thereafter, the controller 100 inputs the first washer state information to the trained time prediction model, thereby obtaining the first remaining time information.

Lastly, the controller 100 dries the laundry based on the obtained first remaining time information.

EMBODIMENTS OF THE DISCLOSURE

Embodiment 1: A method for drying laundry comprises training a time prediction model for obtaining first remaining time information related to complete dryness of the laundry, obtaining first washer state information related to a state of a washer for drying the laundry, obtaining the first remaining time information by inputting the first washer state information to the trained time prediction model, and drying the laundry based on the obtained first remaining time information.

Embodiment 2: In embodiment 1, obtaining the first washer state information may include obtaining first operation information related to an operation of the washer and first internal state information related to an internal state of the washer via a sensor of the washer and obtaining the first washer state information by sampling at least one of the first operation information or the first internal state information at every predetermined period.

Embodiment 3: In embodiment 2, the first internal state information may include at least one of pieces of information related to a first water level in a water container of the washer, a first internal humidity of the washer, or a first internal temperature distribution.

Embodiment 4: In embodiment 2, the first operation information may include at least one of pieces of information related to a first revolutions per minute (RPM) of an inner tub of the washer, a first motor current of the washer, and a first heating temperature of a heater.

Embodiment 5: In embodiment 1, training the time prediction model may include obtaining a terminate-drying condition of the washer, obtaining a plurality of state-time training sets based on the terminate-drying condition, and training the time prediction model with the plurality of state-time training sets, and wherein the plurality of state-time training sets include a plurality of pieces of second washer state information and a plurality of pieces of second remaining time information each of which is related to a respective one of the plurality of pieces of second washer state information.

Embodiment 6: In embodiment 5, obtaining the plurality of state-time training sets may include obtaining the plurality of pieces of second washer state information by sampling, at each predetermined period, at least one of second operation information related to the operation of the washer and second internal state information related to the internal state of the washer while drying particular laundry until the terminate-drying condition is met, obtaining the plurality of pieces of second remaining time information based on the predetermined period and a time consumed from a start time of drying the particular laundry to a time when the terminate-drying condition is met, and obtaining the plurality of state-time training sets by labeling the plurality of pieces of second internal state information with the plurality of pieces of second remaining time information.

Embodiment 7: In embodiment 1, obtaining the first remaining time information may include receiving, from a network, downlink control information (DCI) used for scheduling transmission of the first washer state information, and wherein the first washer state information may be transmitted to the network based on the DCI.

Embodiment 8: In embodiment 7, the method may further comprise performing an initial access procedure with the network based on a synchronization signal block (SSB), wherein the first washer state information may be transmitted to the network via a physical uplink shared channel (PUSCH), and wherein dedicated demodulation reference signals (DM-RSs) of the SSB and the PUSCH may be quasi co-located (QCL) for QCL type D.

Embodiment 9: In embodiment 7, the method may further comprise controlling a transceiver to transmit the first washer state information to an artificial intelligence (AI) processor included in the network and controlling the transceiver to receive AI-processed information from the AI processor, wherein the AI-processed information may include information related to the first remaining time.

Embodiment 10: An intelligent washer may comprise a washing tub, an inner tub included in the washing tub, laundry seated in the inner tub, a motor transferring a rotation force to the inner tub, a sensor obtaining internal state information for the washer to a processor, a display displaying first remaining time information related to complete dryness of the laundry, and the processor training a time prediction model for obtaining the first remaining time information related to complete dryness of the laundry, control the sensor to obtain first washer state information related to a state of the washer for drying the laundry, obtaining the first remaining time information by inputting the first washer state information to the trained time prediction model, and controlling the washing tub to dry the laundry based on the obtained first remaining time information.

Embodiment 11: In embodiment 10, to obtain the first washer state information, the processor may control the sensor of the washer to obtain first operation information related to an operation of the washer and first internal state information related to an internal state of the washer and sample at least one of the first operation information or the first internal state information at every predetermined period.

Embodiment 12: In embodiment 11, the first internal state information may include at least one of pieces of information related to a first water level in a water container of the washer, a first internal humidity of the washer, or a first internal temperature distribution.

Embodiment 13: In embodiment 11, the first operation information may include at least one of pieces of information related to a first revolutions per minute (RPM) of an inner tub of the washer, a first motor current of the washer, and a first heating temperature of a heater.

Embodiment 14: In embodiment 10, to train the time prediction model, the processor may obtain a terminate-drying condition of the washer, obtain a plurality of state-time training sets based on the terminate-drying condition, and train the time prediction model with the plurality of state-time training sets, and wherein the plurality of state-time training sets may include a plurality of pieces of second washer state information and a plurality of pieces of second remaining time information each of which is related to a respective one of the plurality of pieces of second washer state information.

Embodiment 15: In embodiment 14, to obtain the plurality of pieces of state-time training sets, the controller may obtain the plurality of pieces of second washer state information by sampling, at each predetermined period, at least one of second operation information related to the operation of the washer and second internal state information related to the internal state of the washer while drying particular laundry until the terminate-drying condition is met, wherein the processor may obtain the plurality of pieces of second remaining time information based on the predetermined period and a time consumed from a start time of drying the particular laundry to a time when the terminate-drying condition is met, and the processor may obtain the plurality of state-time training sets by labeling the plurality of pieces of second internal state information with the plurality of pieces of second remaining time information.

Embodiment 16: In embodiment 10, the intelligent washer may further comprise a transceiver, wherein to obtain the first remaining time information, the controller may control the transceiver to receive, from a network, downlink control information (DCI) used for scheduling transmission of the first washer state information, and wherein the first washer state information may be transmitted to the network based on the DCI.

Embodiment 17: In embodiment 16, the processor may control the transceiver to perform an initial access procedure with the network based on a synchronization signal block (SSB) through the transceiver, wherein the first washer state information may be transmitted to the network via a physical uplink shared channel (PUSCH), and wherein dedicated demodulation reference signals (DM-RSs) of the SSB and the PUSCH may be quasi co-located (QCL) for QCL type D.

Embodiment 18: In embodiment 16, the processor may control the transceiver to transmit the first washer state information to an artificial intelligence (AI) processor included in the network, wherein the processor may control the transceiver to receive AI-processed information from the AI processor, and the AI-processed information may be information related to the first remaining time.

According to the present disclosure, the laundry drying method using the intelligent washer provides the following effects. An embodiment of the present disclosure may precisely predict the time required for complete dryness of wet laundry. An embodiment of the present disclosure may obtain sampled data of information related to the dry state of laundry and train a time prediction model with the data.

According to the present disclosure, the intelligent washer provides the following effects. An embodiment of the present disclosure may precisely predict the time required for complete dryness of wet laundry. An embodiment of the present disclosure may obtain sampled data of information related to the dry state of laundry and train a time prediction model with the data.

The above-described embodiments of the present disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the present disclosure should be determined by reasonable interpretations of the appended claims and all equivalents of the present disclosure belong to the scope of the present disclosure.

The foregoing features, structures, or effects are included in, but not limited to, at least one embodiment of the present disclosure. The features, structures, or effects exemplified in each embodiment may be combined or modified by one of ordinary skill in the art in other embodiments. Thus, such combinations or modifications should be interpreted as belonging to the scope of the present disclosure.

While the present disclosure has been shown and described with reference to exemplary embodiments thereof, it will be apparent to those of ordinary skill in the art that various changes in form and detail may be made thereto without departing from the spirit and scope of the present disclosure as defined by the following claims. For example, each component in the embodiments may be modified. Such modifications and applications should be construed as included in the scope of the present disclosure as defined by the appended claims.

What is claimed is:

1. A method for drying laundry, the method comprising:
   training a time prediction model for obtaining first remaining time information related to complete dryness of the laundry;
   obtaining first washer state information related to a state of a washer for drying the laundry;
   obtaining the first remaining time information by inputting the first washer state information to the time prediction model; and
   drying the laundry based on the obtained first remaining time information,
   wherein training the time prediction model includes:
      obtaining a terminate-drying condition of the washer, obtaining a plurality of state-time training sets based on the terminate-drying condition, and
training the time prediction model with the plurality of state-time training sets.

2. The method of claim 1, wherein obtaining the first washer state information includes:
obtaining first operation information related to an operation of the washer and first internal state information related to an internal state of the washer via a sensor of the washer; and
obtaining the first washer state information by sampling at least one of the first operation information or the first internal state information at every predetermined period.

3. The method of claim 2, wherein the first internal state information includes at least one of pieces of information related to a first water level in a water container of the washer, a first internal humidity of the washer, or a first internal temperature distribution.

4. The method of claim 2, wherein the first operation information includes at least one of pieces of information related to a first revolutions per minute (RPM) of an inner tub of the washer, a first motor current of the washer, and a first heating temperature of a heater.

5. The method of claim 1,
wherein the plurality of state-time training sets include a plurality of pieces of second washer state information and a plurality of pieces of second remaining time information each of which is related to a respective one of the plurality of pieces of second washer state information.

6. The method of claim 5, wherein obtaining the plurality of state-time training sets includes:
obtaining the plurality of pieces of second washer state information by sampling, at each predetermined period, at least one of second operation information related to an operation of the washer and second internal state information related to an internal state of the washer while drying particular laundry until the terminate-drying condition is met;
obtaining the plurality of pieces of second remaining time information based on the predetermined period and a time consumed from a start time of drying the particular laundry to a time when the terminate-drying condition is met; and
obtaining the plurality of state-time training sets by labeling the plurality of pieces of second internal state information with the plurality of pieces of second remaining time information.

7. The method of claim 1, wherein obtaining the first remaining time information includes receiving, from a network, downlink control information (DCI) used for scheduling transmission of the first washer state information, and wherein the first washer state information is transmitted to the network based on the DCI.

8. The method of claim 7, further comprising performing an initial access procedure with the network based on a synchronization signal block (SSB), wherein the first washer state information is transmitted to the network via a physical uplink shared channel (PUSCH), and wherein dedicated demodulation reference signals (DM-RSs) of the SSB and the PUSCH are quasi co-located (QCL) for QCL type D.

9. The method of claim 7, further comprising:
controlling a transceiver to transmit the first washer state information to an artificial intelligence (AI) processor included in the network; and
controlling the transceiver to receive AI-processed information from the AI processor, wherein the AI-processed information includes information related to the first remaining time information.

10. An intelligent washer, comprising:
a washing tub;
an inner tub included in the washing tub, laundry seated in the inner tub;
a motor transferring a rotation force to the inner tub;
a sensor obtaining internal state information for the washer to a processor;
a display displaying first remaining time information related to complete dryness of the laundry; and
the processor training a time prediction model for obtaining the first remaining time information related to complete dryness of the laundry, controlling the sensor to obtain first washer state information related to a state of the washer for drying the laundry, obtaining the first remaining time information by inputting the first washer state information to the trained time prediction model, and controlling the washing tub to dry the laundry based on the obtained first remaining time information.

11. The intelligent washer of claim 10, wherein, to obtain the first washer state information, the processor controls the sensor of the washer to obtain first operation information related to an operation of the washer and first internal state information related to an internal state of the washer and samples at least one of the first operation information or the first internal state information at every predetermined period.

12. The intelligent washer of claim 11, wherein the first internal state information includes at least one of pieces of information related to a first water level in a water container of the washer, a first internal humidity of the washer, or a first internal temperature distribution.

13. The intelligent washer of claim 11, wherein the first operation information includes at least one of pieces of information related to a first revolutions per minute (RPM) of the inner tub of the washer, a first motor current of the washer, and a first heating temperature of a heater.

14. The intelligent washer of claim 10, wherein, to train the time prediction model, the processor obtains a terminate-drying condition of the washer, obtains a plurality of state-time training sets based on the terminate-drying condition, and trains the time prediction model with the plurality of state-time training sets, and wherein the plurality of state-time training sets include a plurality of pieces of second washer state information and a plurality of pieces of second remaining time information each of which is related to a respective one of the plurality of pieces of second washer state information.

15. The intelligent washer of claim 14, wherein, to obtain the plurality of state-time training sets, the controller obtains the plurality of pieces of second washer state information by sampling, at each predetermined period, at least one of second operation information related to an operation of the washer and second internal state information related to an internal state of the washer while drying particular laundry until the terminate-drying condition is met, wherein the processor obtains the plurality of pieces of second remaining time information based on the predetermined period and a time consumed from a start time of drying the particular laundry to a time when the terminate-drying condition is met, and wherein the processor obtains the plurality of state-time training sets by labeling the plurality of pieces of second internal state information with the plurality of pieces of second remaining time information.

16. The intelligent washer of claim 10, further comprising a transceiver, wherein
to obtain the first remaining time information, the controller controls the transceiver to receive, from a network, downlink control information (DCI) used for scheduling transmission of the first washer state information, and wherein the first washer state information is transmitted to the network based on the DCI.

17. The intelligent washer of claim 16, wherein the processor controls the transceiver to perform an initial access procedure with the network based on a synchronization signal block (SSB) through the transceiver, wherein the first washer state information is transmitted to the network via a physical uplink shared channel (PUSCH), and wherein dedicated demodulation reference signals (DM-RSs) of the SSB and the PUSCH are quasi co-located (QCL) for QCL type D.

18. The intelligent washer of claim 16, wherein the processor controls the transceiver to transmit the first washer state information to an artificial intelligence (AI) processor included in the network, wherein the processor controls the transceiver to receive AI-processed information from the AI processor, and wherein the AI-processed information is information related to the first remaining time information.

* * * * *